United States Patent Office 3,525,773
Patented Aug. 25, 1970

3,525,773
PROCESS FOR PREPARING ARYLOXYALKANOLS
Heinz Schulze, Austin, Tex., assignor to Jefferson Chemical Company, Inc., Houston, Tex., a corporation of Delaware
No Drawing. Filed Apr. 1, 1968, Ser. No. 717,949
Int. Cl. C07c 43/20
U.S. Cl. 260—613                  8 Claims

ABSTRACT OF THE DISCLOSURE

Aryloxyalkanols are prepared by reacting a phenol or polyphenol with an alkylene oxide in the presence of a catalytically active nitrogen compound such as ammonia or an amide. The compounds prepared by the process of this invention are useful as flame retarders, solvents, intermediates for resins and biocidal agents.

BACKGROUND OF THE INVENTION

Field of the invention

The field of the invention is an improved chemical process for preparing aryloxyalkanols.

Description of the prior art

Pentachlorophenoxyethanol prepared by reacting pentachlorophenol with ethylene oxide is reported in Clinton W. MacMullen's U.S. Pat. 2,401,261 (1946). The formation of higher alkylene oxide adducts with phenols is a problem encountered in known processes for aryloxyalkanols. By using a catalytically active nitrogen compound of this invention, very pure aryloxyalkanols are recovered in unexpectedly good yields which are practically free from higher alkylene oxide adducts of phenols.

The compounds prepared by the process of this invention are known from the prior art to be useful as flame retarders, solvents, intermediates and biocidal agents. For example, Italian Pat. 661,486 of Mar. 14, 1964 teaches the use of p-chlorophenoxyethanol as a pre-emergent herbicide in rice. As a further example, my U.S. Pat. 3,382,284, illustrates the use of aryloxyalkanols as intermediates for the preparation of diols.

SUMMARY OF THE INVENTION

The invention is an improved process for preparing aryloxyalkanols which uses a catalytically active nitrogen compound in the synthesis. The aryloxyalkanols are prepared by reacting a phenol or a polyphenol with an alkylene oxide with or without solvent and in the presence of a catalytically active amide or ammonia. Amides useful as catalyst in the practice of this invention are, for example, urea, polyacrylamide, polyvinyl pyrolidone, formamide and dimethylformamide. Phenols and polyphenols useful in the practice of this invention are, for example, halogenated phenols, phenol, bisphenols, novolaks and resorcinol. Halogenated phenols are included in the terms "phenol," "polyphenol" and "aryloxyalkanols" for the purposes of this invention. Alkylene oxides useful in the practice of this invention are, for example, ethylene oxide, propylene oxide and butylene oxide.

DESCRIPTION OF THE PREFERRED EMBODIMENTS

The preparation of pentachlorophenoxyethanol and phenoxyethanol with an active nitrogen compound by the process of this invention is particularly advantageous over known processes. With an active nitrogen compound, a very pure phenoxyethanol is recovered which is practically free of higher ethylene oxide adducts. The following examples illustrate the invention in greater detail.

EXAMPLE I

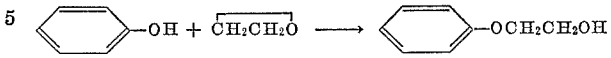

In a stainless steel stirred autoclave, 450 ml. (5 mols) melted phenol and 1 ml. (0.025 mol) formamide are heated at 100° C. under nitrogen and 303 ml. (6 mols) ethylene oxide is added over a 40-minute period and the mixture is digested at 100° C. for 6 hours. Gas chromatographic analysis (area percent) shows that the pale brown reaction product (692 g.) contains 1.5% low boiler, 0.5% phenol, 95.1% phenoxyethanol and 3.0% high boilers. Distillation of 686 grams of the crude phenoxyethanol through a packed column gives the following fractions:

(1) 35 g., B.$_5$ 101–110° C., containing 8.2% lights, 7.6% phenol and 84.2% phenoxyethanol.
(2) 570 g., B.$_5$ 110° C., containing 0.3% light boilers, 99.7% phenoxyethanol. Hydroxyl number is 402 and the nitrogen content 11 parts per million. (Phenoxyethanol requires a hydroxyl number of 406.)
(3) 19 g., B.$_5$ 110–140° C., containing 99.6% phenoxyethanol and a residue of 35 g.

Fraction 2, supra (479 g.), is treated with 10 g. acid clay and filtered. The filtrate is nitrogen free, has a hydroxyl number of 401 and contains 99.9% phenoxyethanol.

EXAMPLE II

In a stainless steel stirred autoclave, 450 ml. (5 mols) melted phenol is reacted as in Example I, supra, with 303 ml. (6 mols) ethylene oxide in the presence of 3.6 g. polyacrylamide as the catalyst. The total reaction time is 11 hours. The reaction product (706 g.) contains 0.6% light boilers, 87.6% phenoxyethanol and 11.9% high boilers. Distillation of a 697 g. charge of the product through a packed column gives the following fractions:

(1) 23 g., B.$_5$ 112° C., containing 96.2% phenoxyethanol.
(2) 535 g., B.$_5$ 112° C., containing 99.9% phenoxyethanol, hydroxyl number 404; 25 parts per million nitrogen.
(3) 28 g., B.$_5$ 110–148° C., containing 60.3% phenoxyethanol and 39.5% high boiler.
(4) 54 g., B.$_5$ 148° C., containing 1.7% phenoxyethanol and 98.3% high boiler.

EXAMPLE III

In a stainless steel stirred autoclave, 450 ml. (5 mols), phenol is reacted as in Example I, supra, with 303 ml. (6 mols) ethylene oxide in the presence of 8 g. polyvinyl pyrolidone of m.w. 10,000. A clear reddish brown reaction product contains 0.8% light boilers, 93.9% phenoxyethanol and 5.4% high boilers.

Distillation of a 678 g. charge of the product through a packed column gives the following fractions:

(1) 22 g., B.$_5$ 96–112° C. with 81.2% phenoxyethanol.
(2) 558 g., B$_5$ 110–112° C. with 99.8% phenoxyethanol, hydroxyl number 404, and 5 parts per million nitrogen.
(3) 11 g., B.$_5$ 112–140° C., 87.3% phenoxyethanol, 12.5% high boiler.

EXAMPLE IV

In a stainless steel stirred autoclave, 450 ml. (5 mols) phenol is reacted as in Example I, supra, with 303 ml. (6 mols) ethylene oxide in the presence of 1.2 g. (0.02 mol) urea. The reaction product contains 0.4% light boilers, 92.5% phenoxy ethanol and 7.1% high boilers. Distillation of the product through a packed column gives the following fractions:

(1) 26 g., B.$_5$ 110–112° C. with 0.1% phenol and 97.6% phenoxyethanol.
(2) 577 g., B.$_5$ 110–112° C., 99.9% phenoxyethanol, hydroxyl number 404, 93 parts per million nitrogen.

Fraction 2, supra, is treated with acid clay and filtered. The filtrate (309 g.) contains 99.9% phenoxyethanol, has a hydroxyl number of 406 and contains 1 part per million nitrogen.

EXAMPLE V

In a stainless steel stirred autoclave, 270 ml. (3.0 mols) phenol is reacted as in Example I, supra, at 130° C. with 182 ml. (3.6 mols) ethylene oxide in the presence of 3 ml. (0.044 mol) concentrated aqueous ammonia. The resulting light brown reaction product (414 g.) contains 22% light boilers, <0.1% phenol, 93.5% phenoxyethanol and 4.3% high boilers. Distillation of a charge of the product through a packed column gives the following fractions:

(1) 25 g., B.$_5$ 108° C. containing 1.4% lights, 0.2% phenol and 98.4% phenoxyethanol.
(2) 337 g., B.$_5$ 110° C. containing 99.9% phenoxyethanol; hydroxyl number is 401.

EXAMPLE VI

In a stainless steel stirred autoclave 266 g. of 86% (1 mol) pentachlorophenol is reacted as in Example I, supra, at 170° C. with 87 ml. (1.25 mols) propylene oxide in 100 ml. toluene and in the presence of 1.55 ml. (0.02 mol) dimethylformamide. The dark brown reaction product is diluted with 100 ml. toluene, digested with 40 g. acid clay at 50° C. and filtered warm. The filtrate contains 52.0% light boilers, 0.2% pentachlorophenol, 44.9% pentachlorophenoxypropanol and 1.0% high boilers. After the solvent is stripped the product is distilled in a high vacuum (<0.1 mm.) through a packed column and gives the following fractions:

(1) 13 g., B.$_{<0.1}$ 154° C. (pot temperature) containing 8% light boilers, 3.3% pentachlorophenol, 11.3% unknowns, 77.2% pentachlorophenoxypropanol and 0.2% high boilers.
(2) 245 g., B.$_{<0.1}$ 160° C. (pot temperature) a viscous light brown liquid crystallizes gradually on storage and contains 0.2% pentachlorophenol, 3.2% unknowns, 95.9% pentachlorophenoxypropanol and 0.7% high boilers.

EXAMPLE VII

In a stainless steel stirred autoclave, 266 g. of 86% (1 mol) pentachlorophenol is reacted as in Example I, supra, at 150° C. with 64 ml. (1.25 mols) ethylene oxide in 100 ml. toluene and in the presence of concentrated aqueous ammonia. The solid reaction product is melted, diluted with 100 ml. toluene, treated with 60 g. acid clay at 50°–60° C. and filtered warm. The filtrate is stripped from solvent and distilled in high vacuum and gives the following fractions:

(1) 28 g., B.$_{<0.1}$ 159° C., pot temperature, M.P. 88–89° C., containing 8.6% unknowns, 90.2% pentachlorophenoxyethanol and 1.2% others.
(2) 221 g., B.$_{<0.1}$ 160° C. pot temperature, M.P. 90–91° C., containing 3.2% unknowns, 96.0% pentachlorophenoxyethanol and 0.8% others.

Preferred catalyst concentrations for my invention are within the range of 0.05 mol to 0.005 mol catalyst to 1 mol phenol or polyphenol, however higher catalyst concentrations can be used.

The preferred amide catalyst concentration is 0.03 mol amide to 1 mol phenol or polyphenol. The preferred ammonia catalyst concentration is 0.013 mol ammonia to 1 mol of phenol or polyphenol.

I claim:

1. In a process for preparing aryloxyalkanols from a phenol or a polyphenol and an alkylene oxide, the improvement which comprises: reacting one mol of phenol or polyphenol with from about 1 to about 2 mols of ethylene oxide, propylene oxide, or butylene oxide in the presence of ammonia at from about 50° C. to about 170° C.

2. A process according to claim 1 for preparing phenoxyethanol from a phenol and ethylene oxide.

3. A process for preparing phenoxyethanol from phenol and ethylene oxide according to claim 1 wherein the ammonia concentration is about 0.013 mol ammonia to about 1 mol phenol.

4. In a process for preparing haloaryloxyalkanols from a halophenol or a polyhalophenol and an alkylene oxide the improvement which comprises: reacting one mol of halophenol or polyhalophenol with from about 1 to about 2 mols of ethylene oxide, propylene oxide, or butylene oxide in the presence ammonia at from about 50° C. to about 170° C.

5. A process according to claim 4 for preparing a halophenoxyethanol from a halophenol or polyhalophenol and ethylene oxide.

6. A process according to claim 5 for preparing pentachlorophenoxyethanol from pentachlorophenol and ethylene oxide.

7. A process for preparing a halophenoxyalkanol according to claim 5 wherein the ammonia concentration is within the range of about 0.05 mol to 0.005 mol ammonia to about 1 mol halophenol.

8. A process according to claim 7 for preparing pentachlorophenoxyethanol from pentachlorophenol and ethylene oxide.

References Cited

UNITED STATES PATENTS

| | | |
|---|---|---|
| 2,428,235 | 9/1947 | Marple et al. |
| 2,852,566 | 9/1958 | Jeltsch. |
| 3,148,171 | 9/1964 | St. Clair et al. |

BERNARD HELFIN, Primary Examiner

UNITED STATES PATENT OFFICE

CERTIFICATE OF CORRECTION

Patent No. 3,525,773                  Dated August 25, 1970

Heinze Schulze
Assignor to Jefferson Chemical Company, Inc.
Houston, Texas, a corporation of Delaware It is certified that error appears in the above identified patent and that said Letters Patent are hereby corrected as shown below:

In the specification:

Column 2, line 19 change $B._5$ to $b_5$

Column 2, line 21 change $B._5$ to $b_5$

Column 2, line 25 change $B._5$ to $b_5$

Column 2, line 41 change $B._5$ to $b_5$

Column 2, line 42 change $B._5$ to $b_5$

Column 2, line 44 change $B._5$ to $b_5$

Column 2, line 46 change $B._5$ to $b_5$

Column 2, line 58 change $B._5$ to $b_5$

Column 2, line 59 change $B._5$ to $b_5$

Column 2, line 61 change $B._5$ to $b_5$

Column 3, line 3 change $B._5$ to $b_5$

Column 3, line 5 change $B._5$ to $b_5$

Page 2

UNITED STATES PATENT OFFICE

CERTIFICATE OF CORRECTION

Patent No. 3,525,773　　　　　　　　　　Dated August 25, 1970

Heinze Schulze
Assignor to Jefferson Chemical Company, Inc.
Houston, Texas, a corporation of Delaware In the specification (continued):

Column 3, line 22 change $B._5$ to $b_5$

Column 3, line 24 change $B._5$ to $b_5$

Column 3, line 41 change $B_{<0.1}$ to $b_{<0.1}$

Column 3, line 45 change $B._{<0.1}$ to $b_{<0.1}$

Column 4, line 3 change $B._{<0.1}$ to $b_{<0.1}$

Column 4, line 6 change $B._{<0.1}$ to $b_{<0.1}$

SIGNED AND
SEALED

FEB 23 1971

(SEAL)
Attest:

Edward M. Fletcher, Jr.
Attesting Officer

WILLIAM E. SCHUYLER, JR
Commissioner of Patents